United States Patent
Baudry et al.

(10) Patent No.: US 7,058,979 B1
(45) Date of Patent: Jun. 6, 2006

(54) METHOD FOR INSERTING A WATERMARK INTO AN IMAGE

(75) Inventors: Séverine Baudry, Beauchamp (FR); Didier Nicholson, Asnieres S/Seine (FR); Catherine Simon, Saint-Cloud (FR); Philippe N'Guyen, Boulogne Billancourt (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/926,369

(22) PCT Filed: Apr. 7, 2000

(86) PCT No.: PCT/FR00/00900

§ 371 (c)(1),
(2), (4) Date: Oct. 22, 2001

(87) PCT Pub. No.: WO00/65840

PCT Pub. Date: Nov. 2, 2000

(30) Foreign Application Priority Data

Apr. 23, 1999 (FR) .................................. 99 05194

(51) Int. Cl.
*G06F 11/00* (2006.01)

(52) U.S. Cl. .................... 726/32; 726/33; 726/26; 382/289; 382/232; 382/100

(58) Field of Classification Search ............. 726/26, 726/32–33; 382/100, 232, 289
See application file for complete search history.

(56) References Cited

U.S. PATENT DOCUMENTS

| | | | |
|---|---|---|---|
| 6,341,350 B1 * | 1/2002 | Miyahara et al. | 713/176 |
| 6,633,670 B1 * | 10/2003 | Matthews | 382/176 |
| 6,664,976 B1 * | 12/2003 | Lofgren et al. | 345/634 |
| 6,775,391 B1 * | 8/2004 | Hosaka et al. | 382/100 |
| 6,792,128 B1 * | 9/2004 | Nguyen | 382/100 |
| 6,807,285 B1 * | 10/2004 | Iwamura | 382/100 |
| 6,813,392 B1 * | 11/2004 | Kawabata | 382/294 |
| 6,847,468 B1 * | 1/2005 | Ferriere | 358/1.2 |
| 6,915,000 B1 * | 7/2005 | Tanaka | 382/100 |

FOREIGN PATENT DOCUMENTS

| | | |
|---|---|---|
| EP | 0 766 468 | 4/1997 |
| EP | 0 840 513 | 5/1998 |
| EP | 0 902 591 | 3/1999 |

* cited by examiner

*Primary Examiner*—Norman M. Wright
(74) *Attorney, Agent, or Firm*—Oblon, Spivak, McClelland, Maier & Neustadt, P.C.

(57) ABSTRACT

A process for watermarking images that includes embedding into the images before their transmission a message by modifying the data characteristic of the images. Further, a co-watermarking is performed by periodic embedding of a binary matrix into the image to determine on reception the co-ordinates of the origin of the initial image and allow the registration of the images received relative to this origin so as to make it possible to read the embedded message. Such a process may find particular application to the transmission of stationary or video images.

11 Claims, 5 Drawing Sheets

Figure 5:
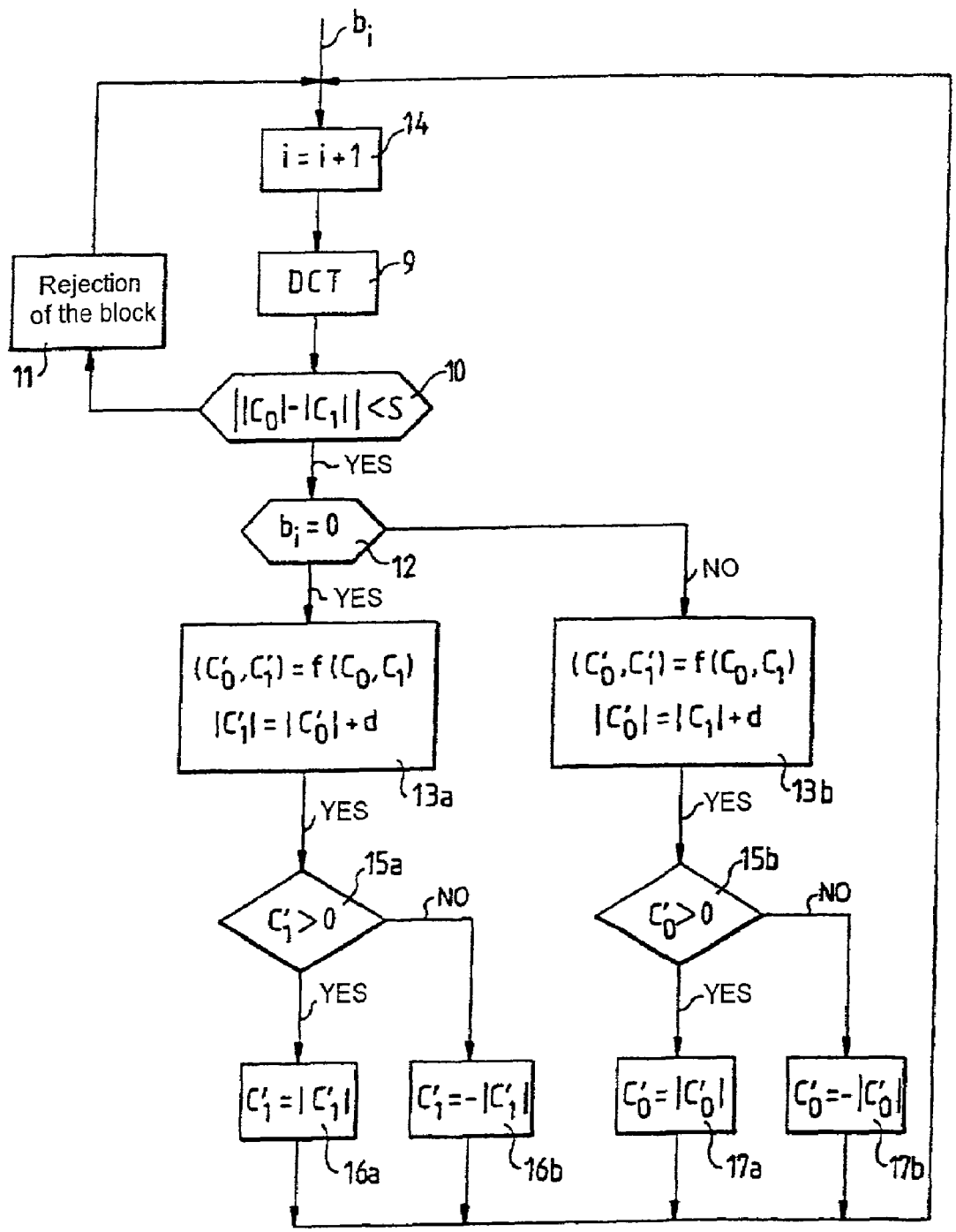

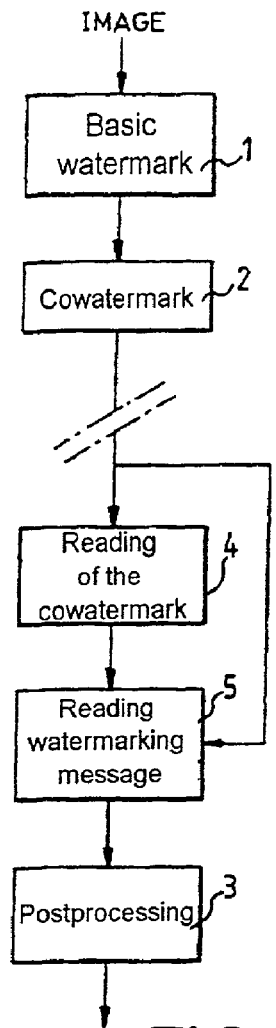
FIG.1
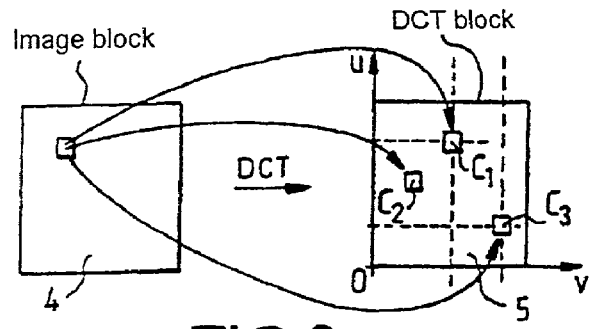
FIG.2
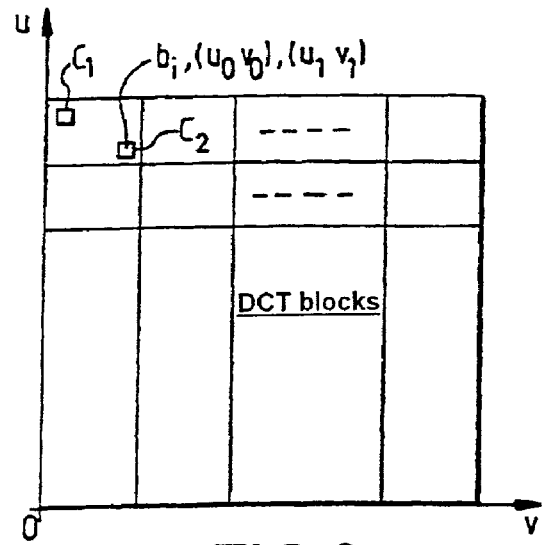
FIG.3
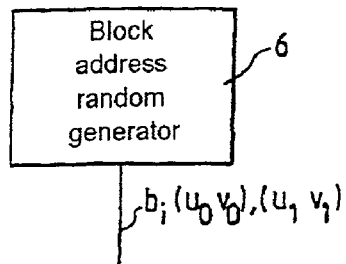
FIG.4
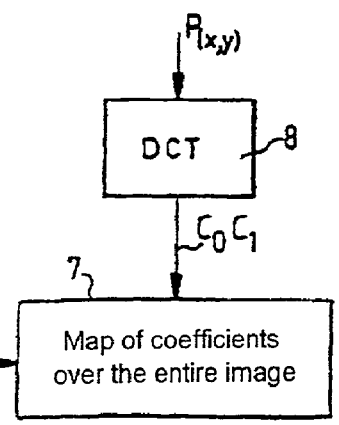

METHOD FOR INSERTING A WATERMARK INTO AN IMAGE

The present invention relates to an image watermarking process for the processing and transmission of stationary or video images.

In telecommunication, image watermarking is the act of transmitting information in an image or a sequence of images without entailing perceptible modifications in the composition of the image or of the image sequence received. This procedure is also sometimes known as "watermarking".

This definition recalls that of steganography, also called transmission by subliminal channel, which is the art of sending messages in a hidden manner, a seemingly innocent piece of information containing a hidden message which can be read only by the rightful recipients. Unlike cryptography, steganography conceals the very existence of the subliminal message.

The essential difference between image watermarking and steganography resides in the choice of what is called the "cover channel", namely the plaintext message which contains the hidden message.

In steganography, the sender can make this choice himself, whereas in the case of watermarking it is imposed. The motivations of the two techniques are also not the same since the sender of a steganographic message wishes to be able to communicate secret information without arousing the suspicions of a sentry, whereas the sender of a watermarked image wishes that the hidden message should not perceptively disturb a work and should not be easily scrambled, but the fact that anybody may possibly be informed of the presence of a hidden message in an image is not problematic, quite the contrary it may have a beneficial deterrent effect when for example the watermark is intended to be used as a sign enabling the images to benefit from the protection afforded by royalties and copyright in particular. In this case the watermark is produced by embedding in an image or a sequence of images a piece of information which characterizes the work and its owner. Automatic read-out of the embedded information makes it possible to check whether the work has not been broadcast illegally, or else to check whether the author has indeed received the corresponding royalties. Image watermarking also makes it possible to track documents when the embedded information is characteristic of the person who has bought it, this making it possible, upon elicit copying or distribution, to automatically ascertain who is responsible for the fraud.

The same holds for all automatic image or image sequence indexing applications.

The attraction of using watermarking lies in the possibility of making the checks automatic. It is in fact utopian to contemplate manually checking the broadcasting of audiovisual works, given the multiplicity of transmission channels. The watermarking of images enables this problem to be partially solved by making it possible, starting from a work, to automatically determine its identifying number and possibly its source, it subsequently being up to the society of authors to determine whether the work has indeed been broadcast illegally. The techniques of watermarking also offer the advantage of not requiring any standardization or prior agreements between the various parties unlike the current practice with regard to hardware protection against copying incorporated into digital video discs also known by the abbreviation "DVD" standard for "Digital Video Disc".

To be able to transmit a message through an image, the latter has to be modified in one way or another. The modifications made by watermarking must however satisfy a certain number of conditions so as to be able to be compatible with the applications envisaged.

Thus, the watermark should not visibly modify the images so as not to degrade their quality. Consequently, the marking must be discreet.

As will be shown later, many watermarking methods described in the literature require the presence of the original image in addition to the modified image when reading the message. Hence, these methods seem to be wholly unsuitable for the protection of works by copyright since they assume that the author has labelled a work apparently belonging to him and broadcast illicitly, before being able to prove by the reading of the watermark that the work is indeed his own. In this case it is much faster to compare the two works than to read a watermark. The reading of a watermark from the modified image alone must therefore be possible for automatic "monitoring" applications.

Watermarking methods using both images when reading may however be used for the tracking applications alluded to above, the identity of the work then being certain, the watermark merely making it possible to advise as to the source of the copy concerned.

Watermarking becomes a trivial problem if one is sure that the watermarked image will not be modified in any manner. It is then sufficient to modify the low-order bits of the pixels, this being a completely invisible manipulation and making it possible to embed as many bits as there are pixels. However, this ideal case is never encountered in practice, since images, and in particular image sequences, are almost always compressed to obtain an acceptable bit rate during transmission or to save memory space during storage. This compression may be lossless as is the case with the "JPEG useless" standard, but it is usually irreversible for reasons of efficacy in the transmissions of images according to the JPEG and MPEG standards. It is consequently vital for the watermark to be able to survive these transformations, this being all the more difficult since the compression takes place at low bit rate. Consequently the marking must be sufficiently strong, this being a constraint which conflicts with the above invisibility constraint.

Neither is it rare for a work, during its broadcasting in particular, to be modified so as to aid transmission. Post-production often introduces for example a "cropping", that is to say a chopping of the sequences. Their format may also be modified, in particular when switching from the American television standard (720×480 images at 30 Hz) to the European format (720×576 images at 25 Hz). Resamplings for magnifying or reducing the images are also frequent.

Within the context of the watermarking of images these transformations pose two types of problems, on the one hand, they are not in general reversible, this obviously being true upon chopping, and also upon an image reduction since a great deal of information is lost in the high frequencies of the image, and on the other hand, the transformation existing between the original image and the transformed image is not generally known. It follows that the watermark must either be invariant under geometrical transformation, or be accompanied by additional information allowing synchronization. This transformation may take the form of a particular watermark making it possible to determine the transformation performed.

Digital image and film manipulation is especially easy provided that the user has even very rudimentary image processing software. Geometrical transformations are among the simplest manipulations, they consist in particular in performing image chopping, magnifications or reductions, montages of several sequences, collages and more rarely rotations. Frequency modifications are relatively easy, as are colorimetry manipulations consisting in switching from colour to black and white or the reverse for films, transformation of histograms etc. The possibility should also be noted of switching from digital to analogue or vice versa for image photocopying and video cassette digitizing operations etc., which involve additional noise as well as geometric or calorimetric distortions.

The watermark must also be resistant to deliberate attacks from pirates aimed at destroying the mark so as to be able to broadcast a work without paying royalties. The attack processes may be of two types, either they consist of attempts to reverse the marking procedure, blindly or with the aid of partial or complete knowledge of the marking algorithm, or by scrambling the message by adding noise or by transformation by filtering for example. The first type of attack can be countered using processes similar to those employed in cryptography using secret keys. In the second type of attack, the pirating must make a compromise between the force of the scrambling and the degradation in quality which results. This circumstance may moreover be exploited in order to produce a good watermark by marking with a force which is just less than the threshold of visibility, the entire problem being to determine this threshold accurately.

Finally, the watermark must be of low complexity. Complexity is a crucial problem for a real system. Whereas writing can sometimes be carried out off-line, it must necessarily be possible to perform reading on-line for "monitoring" applications, and it is frequently this step which is the most expensive in terms of computation time.

Although the field of watermarking is relatively recent, a large number of approaches have already been proposed in the literature. They call upon various methods of watermarking which may be classified into methods of spatial or pixelwise watermarking, transform-based or frequency-based methods of watermarking and coding-based watermarking methods.

Other approaches have also been studied, for watermarks of the audio, text or computer-generated image type propose [sic] a particular algorithm. Others propose a more general formulation of the problem, in particular in terms of information theory. The articles which describe them attempt to more accurately quantize the passband available for the watermarked message. Other articles present methods of attack specific to a particular or more general watermarking technique. In parallel, techniques of formalizing these attacks are appearing, using game theory or the concepts of cryptography and of steganography for example, aimed at allowing the devising of more robust systems.

In the methods of spatial watermarking, the writing of the message is performed directly in the plane of the image, generally by modifying the luminance of the pixels.

In the transform-based methods of watermarking the writing of the message is performed on a transform of the image or of a sequence. The transforms used are generally of the Fourier, cosine transform or wavelet types.

Finally, in the coding-based watermarking methods the watermark is embedded by directly modifying certain elements obtained during encoding. This relates for example to the motion vectors in MPEG coding, the blockwise or "matching blocks" coding of a fractal compression, etc. DCT coding methods by cosine transform, abbreviated as "Discrete Cosine Transform" may also be included in this category.

These large families may also be divided into two sub-families which cover the blockwise coding methods and the image coding methods. In the blockwise coding methods, of the DCT type or the pixelwise coding methods for example, the coding unit is the block in which one or more bits are embedded. In the image coding methods, the watermark is made on the image in a global manner, for example by using a global Fourier transform of the image.

The spatial methods are among the oldest and are the simplest. The advantage of these methods is that they allow generally faster writing of the watermark requiring no expensive transformations as is the case for example for methods based on the Fourier transformation. They are however less robust to compression techniques based on the calculation of DCT transforms.

Among the spatial watermarking methods the algorithm dubbed "patchwork" by Messrs Bender, Gruhl, Morimoto, a description of which may be found in the article entitled "Techniques for Data Hiding" published in the SPIE Proceedings, Vol. 2420, p. 40, Feb. 95 relies on the observations that the eye is rather insensitive to small changes of luminance, especially when they are random and akin to low-power noise and that the averages of the luminances of two sets of N points chosen randomly are "on average" equal when the number N is large.

In this algorithm, writing takes place using a secret key, and n pairs of points $A_i$ and $B_i$ respectively of luminance $a_i$ and $b_i$, which are chosen in a pseudo-random manner in the image. The luminance of the chosen points is modified according to the relations $a_i'=a_i+1$ and $b_i'=b_i-1$. Since the points are chosen randomly, the difference $a_i-b_i$ will on average be zero for N sufficiently large. On the other hand, the difference $a'_i-b'_i$ will on average be almost equal to 2, thereby allowing decoding.

To retrieve the initial points, reading takes place with the aid of the secret key. Calculation of the quantity $$S = \sum_{i=0}^{N-1} (ai - bi)$$

makes it possible to decide that the image is watermarked when $S \cong 2N$.

This method makes it possible to embed just one bit into the image, but it can be generalized onto several bits by choosing several disjoint sets of points. It has the advantage of exhibiting good invisibility, and good resistance to transformations such as compression, the addition of noise, etc., all the more so the larger the number N. It also exhibits good resistance to the chopping of the image, due to the dissemination of the information, and good resistance to attacks provided that the key is not known.

On the other hand it has the drawbacks of weak resistance to geometrical transformations and of demanding a compromise between the number of bits to be embedded and the resistance of the message.

Another method using amplitude modulation of the chrominance which is described in the article by Messrs Kutter, Jordan, Bossen entitled: "Digital Signature of Colour Image Using Amplitude Modulation" and published by SPIE EI 97 consists in modifying the blue component of the chrominance signal to which the eye is rather insensitive and in acting as a function of the marking force on the modulation of the luminance signal while allowing for the fact that the retina is more sensitive to contrasts than to luminance proper, the acuity of the eye being lower at high luminance. A zigzag scan is performed so as to disregard the size of the image. Reading is performed by linear prediction. According to this method the message can be written in a robust manner by embedding the same bit several times. Zigzag scanning makes it possible to disregard the size of the image, and also to disregard synchronization should the bottom or the left of the image be chopped. The method also exhibits good resistance to attacks. On the other hand the complexity of the calculations becomes very significant in the case where geometrical transformations have to be performed, since this method requires an exhaustive search in the parameter space.

Another spatial watermarking method described by the authors Jean François Delaigle and Benoit Macq in Talisman Project Report Jan. 97 entitled "Digital Watermarking" implements an algorithm allowing the embedding of one bit per image block of dimension n×n. A block is divided into two groups of pixels A and B. The values of the pixels of the two groups are modified in such a way that the difference of the averages of the luminances of the groups A and B is the bearer of the bit to be transmitted. These modifications are carried out without modifying the global average of the luminances of the block so as to retain good invisibility. The marking force depends on a parameter I. This method yields a resistance to coding according to the JPEG standard of 70% with an error rate of 5% for a marking luminance level I=5. The marking is invisible for marking levels which are not too high for I<8, but the visibility and the robustness depend for a specified marking level on the size of the block. However, the method has a major drawback, namely of exhibiting low resistance to geometrical transformations and to attacks of the line deletion or column deletion type.

Coding methods based on frequency transforms, such as the one described in patent application DE 19521969, are doubly attractive. On the one hand they make it possible to anticipate the compression by writing the watermarking information into the components of the image having the least chance of being modified and they make it possible on the other hand to allow for the perception characteristics of the human eye so as to mark more strongly in the least perceptible components.

These two aspects are nevertheless antithetical since the compression techniques rely specifically on the characteristics of the eye.

According to a first approach published by Messrs Eckhard Koch and Jian Zhao in the article entitled "Embedding Robust Labels into Images for Copyright Protection", proc.Int. Congr. Intellectual Property Rights for Specialized Information, Knowledge and New Technologies, Vienna, Austria August 95, the writing of the watermarking message is performed by modifying the coefficients of the DCT discrete cosine transform by anticipating the quantization noise introduced by the image compressions performed according to the JPEG or MPEG processes so as to ensure the survival of the watermark during these compressions. This approach makes it possible to obtain good resistance to compression since the quantization noise is no longer random noise since it is anticipated during the marking. The resistance depends of course on the quantization factor Q used during marking. The higher the factor Q, the better the robustness, although at the cost of an increase in visibility. The method is attractive also in that the watermarking algorithm can be implemented directly in a JPEG or MPEG coder, thus making it possible to profit directly from the calculations of the DCT coefficients performed during compression. However, the performance of the method may degrade very rapidly when the blocks of DCT coefficients of the image do not coincide with the blocks of the original image, this occurring for example when the image has been slightly shifted, in this case the quantization noise is then no longer predictable.

Another method described by Messrs Ingemar Cox, Joe Killian, Thomson Leighton, Talal Shamoon in the article published in IEEE Trans. on Image Processing, Vol. 6 No. 12, Dec. 97 entitled "Secure Spread Spectrum Watermarking for Multimedia" carries out a "spread band" approach consisting in embedding the watermarking message into all the frequency components of the image after having calculated the DCT coefficients, thereby rendering the energy of the message on each of the frequencies indiscernible but, on the other hand, making the signal-to-noise ratio high. Visibility criteria are moreover used to weight the force of the marking according to the frequency components. The advantages of this method are of exhibiting very good resistance to JPEG and MPEG type compressions and of offering very good resistance to geometrical transformations provided that these transformations are known. The method offers multi-watermarking possibilities. It is good at resisting attacks by collusion by averaging over documents bearing different watermarks, and at resisting scrambling attempts since in the absence of knowledge of the watermarking message, it is necessary to add sufficiently strong noise to all the frequencies, thereby degrading the visual quality of the image, in order to destroy the watermark. However, the method has a major drawback, namely that it is necessary to have the original image in order to retrieve the watermark, the latter being obtained by subtracting the transformed watermarked image from the transformed original image.

Another method described in an article by Messrs Joseph O'Ruanaidh, Thierry Pun entitled: "Rotation, Scale and Translation Invariant Digital Image Watermarking", published in the proceedings of IEEE ICIP 97 Vol. 1, p. 536–539 Santa Barbara, consists in using a space which is invariant under rotation, translation and scaling, in order to disregard the geometrical transformations which may be carried out on the image. This is achieved by exploiting the properties of the Fourier-Mellin transform. The method has the advantage of exhibiting high resistance to geometrical transformations without requiring prior synchronization. However, the invariance properties of the Fourier-Mellin transform are no longer complied with when the circular translation is replaced by a "cropping". Moreover, the calculations which demand transformations in a log-polar plane are relatively complex.

Another method described in the article by Messrs Joseph O'Ruanaidh, W. Dowling, F. Boland entitled "Phase Watermarking of Digital Images" published by ICIP 96 uses a Fourier transform, writing the watermarking message with the aid of a phase modulation. The method has the advantage of offering resistance to the JPEG and MPEG compression processes. However, it has the drawback that the phase modifications appear in a more visible manner than the amplitude modulations.

Another method described in the article by Messrs Mitchell Swanson, Bin Zhu, Ahmed Tewfik, entitled "Multiresolution Scene-based Video Watermarking Using Perceptual Models", published in IEEE journal on selected areas in communications, Vol. 16, No. 4, May 98, is specifically intended for the watermarking of video sequences. It consists in working in a transformed space obtained by decomposition into temporal wavelets using a perceptual model. According to the method a watermarking message is generated with the aid of two keys, one corresponding to the information to be transmitted and the other calculated with the aid of the original video sequence. The second key makes it possible to solve the known problem of the deadly embrace, that is to say to prevent a pirate from rewatermarking a sequence with his own message and subsequently claiming priority of his watermark. This information is encrypted with the aid of a BBS generator. The video sequence is subsequently segmented into scenes, and each scene is decomposed into temporal wavelets so that the statistical components of the scene are made to appear in the low frequencies and the dynamic elements of the scene are made to appear in the high frequencies. A spatial perceptual mask is calculated for each wavelet coefficient, then each wavelet coefficient is decomposed by calculation of DCT coefficients so as to set up a frequency mask and perform a shaping of the watermark with the aid of the masks thus determined and apply it to the temporal wavelets. To detect the watermarking message at reception it is necessary to ascertain the original sequence and also the embedded watermarking message. This can be achieved without any temporal synchronization information being required regarding the sequence recovered. The method has the advantages of exhibiting good resistance to the modifications performed on the video sequences, of being able to make fine allowance for visibility through the use of masking criteria and of exhibiting high redundancy in the writing of the information which takes place in several frequency bands. The drawback of this method resides however in the fact that it requires the use of the original sequence for the reading of the watermark and that it allows the embedding of a single bit only.

In coding methods the watermark is embedded by modifying certain elements obtained when coding an image such as for example the motion vectors of the coding according to the MPEG standard or the "matching blocks" of fractal compression. These methods make it possible to work directly in the encoded images, thus allowing faster writing and above all faster reading of the watermark. They also allow better consideration of the distortions introduced by the coding. Unfortunately, this consideration may become ineffective when re-encoding with different parameters.

A first method of watermarking described by Messrs T. Vynne, F. Jordan, in an article entitled "Embedding a Digital Signature in a Video Sequence using Motion Vectors" preprint of special session on copyright protection and access control for multimedia services of ICIP 96, consists in writing the watermarking message by modifying the motion vectors of the MPEG coding process. The coding procedure commences by choosing a set of blocks in the image to embed the watermarking information and by calculating for each of the blocks the optimal motion vector with respect to the previous image. The writing of the message is performed by modifying the low-order bit of the components of the motion vector. The visibility of the watermark can be reduced by making sure that the block variances obtained with the aid of the original motion vector and of the modified motion vector are much the same. The advantage of this method is that it allows direct watermarking in the MPEG transmission stream. On the other hand, the method is sensitive to the motion estimators used and to re-encoding.

A second coding method of the authors Joan Puate, F. Jordan, described in an article entitled: "Using Fractal Compression Scheme to Embed a Digital Signature into an Image", proc.SPIE Video Techniques and Software for Full-Service Networks, Oct. 96, consists in writing the watermark by modifying the parameters used in fractal coding. The robustness of the method depends on the size of the image partition blocks used to carry out the coding. The bigger the size of the blocks, the more robust the method, but the worse the quality of the image obtained. Moreover, the computation time is considerable.

The aim of the invention is to alleviate the aforesaid drawbacks.

Accordingly, the subject of the invention is a process for watermarking images for the processing and transmission of stationary or video images of the type consisting in embedding in the images before their transmission, a message by modifying the data characteristic of the images, characterized in that it consists in performing a co-watermarking by periodic embedding of a binary matrix P into the image so as to determine on reception the co-ordinates of the origin of the initial image and allow the registration of the images received relative to this origin so as to make it possible to read the embedded message.

The process according to the invention has the advantage that it makes it possible to perform watermarking which is at the same time robust, reliable and of low complexity.

The invisibility of the watermark is complete, even on professional viewing equipment of very high quality.

Unlike the aforesaid prior art processes, the watermark can be read out without needing the unwatermarked original image, this making it possible to apply the process to the automatic checking of broadcasts.

The marking is good at resisting MPEG and JPEG compressions.

The co-watermarking process implemented also offers resistance to image chopping, this being important given the current video coding and transmission systems. The low complexity of this algorithm in terms of reading constitutes a definite advantage relative to the methods of synchronization by exhaustive search such as the EPFL's spatial algorithm for example.

Finally, it also makes it possible to be sure of the reliability of the message read out, by giving information regarding the quality of this message. The error rate for the final message, as well as the decision latency time can be parametrized to accommodate the constraints of each application.

Other characteristics and advantages of the invention will become apparent with the aid of the description which follows in conjunction with the appended drawings which represent:

FIG. 1 the main steps of the processing for carrying out the transmission of an image watermark according to the invention.

FIGS. 2 and 3 an illustration of the method of watermarking by coding by DCT transform implemented according to the invention.

FIG. 4 a flowchart illustrating the procedure for mapping the DCT watermarking coefficients over the entire image, implemented by the invention.

Figure 6:
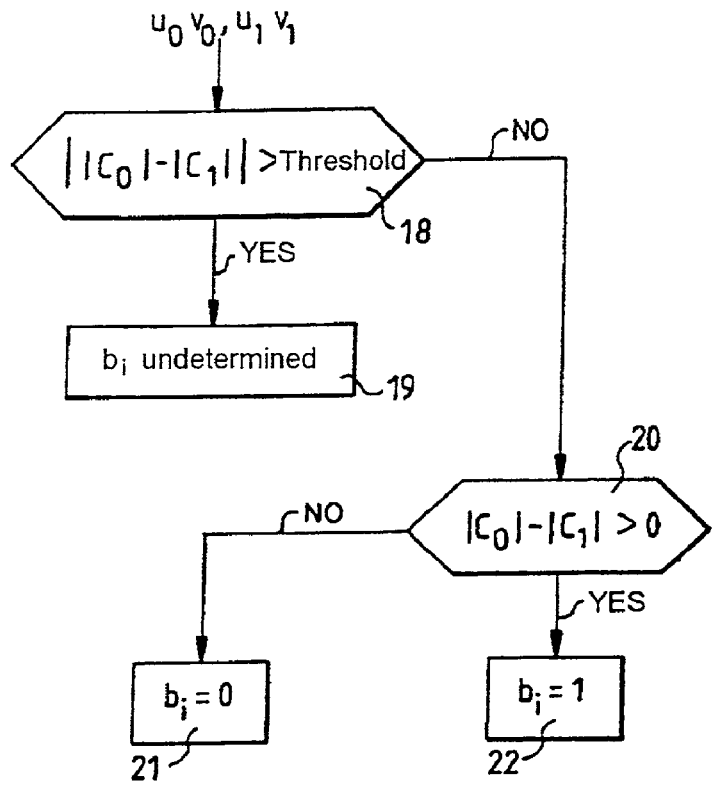

FIGS. 5 and 6 the various steps of the watermarking procedure according to the invention, depicted as a flowchart.

Figure 7:
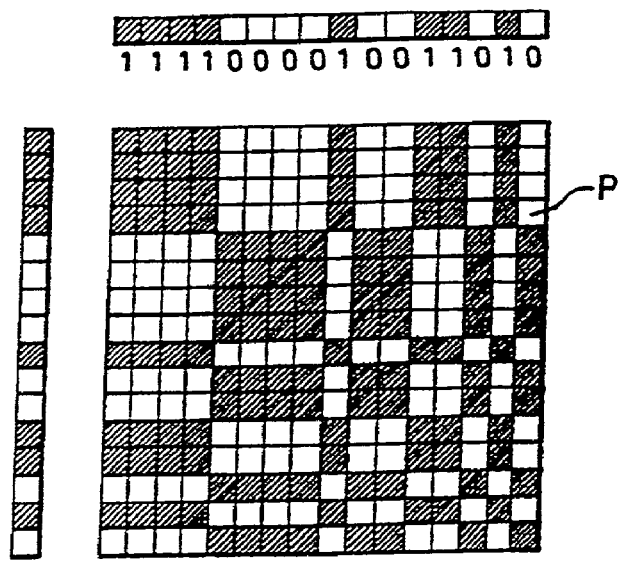

FIG. 7 the obtaining of a co-watermarking matrix according to the invention.

Figure 8:
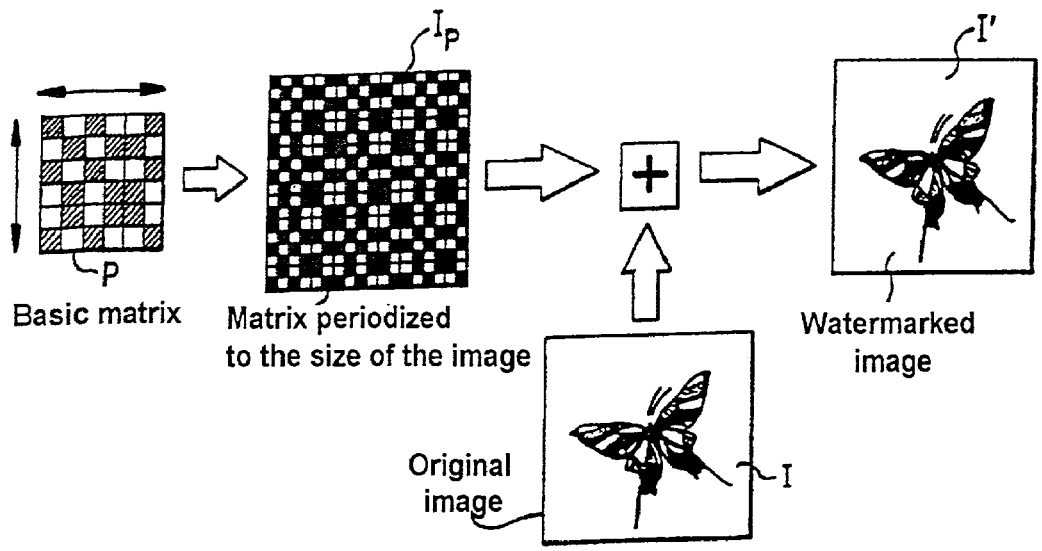

FIG. 8 a diagram illustrating the principle of writing of a co-watermark according to the invention.

Figure 9:
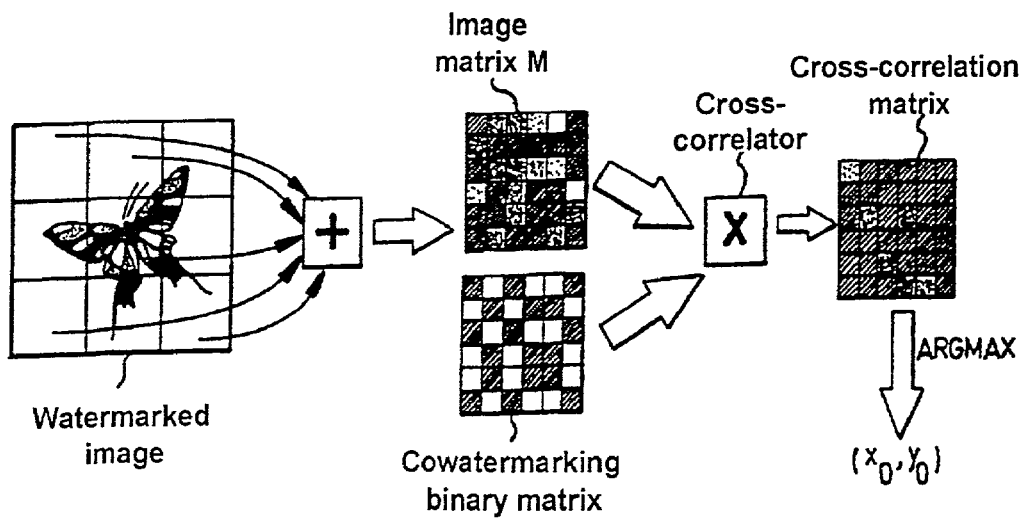

FIG. 9 a diagram illustrating the principle of reading of a co-watermark according to the invention.

Figure 10:
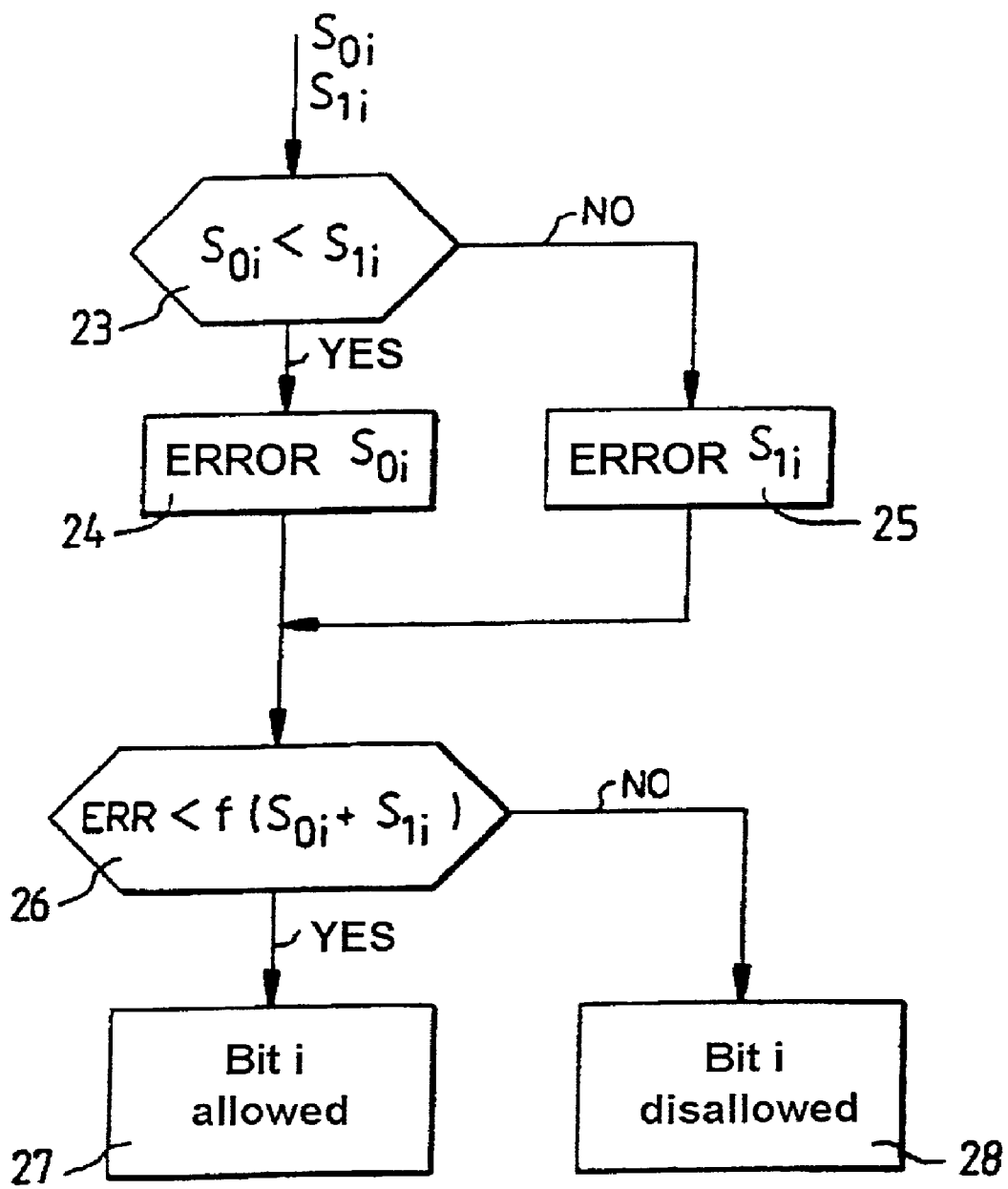

FIG. 10 some steps of the postprocessing performed by the invention depicted in the form of a flowchart.

The watermarking process for the transmission of images according to the invention which is represented in FIG. 1 implements three algorithms, a basic watermarking algorithm 1 which makes it possible to embed the watermarking message into the image, a co-watermarking algorithm 2 allowing spatial resynchronization of the image when the latter has undergone a shift and a postprocessing algorithm 3 which enables the data emanating from the reading of the basic watermark 4 and from the co-watermark 5 to be made reliable. These algorithms can be used either for the processing of stationary images, or for the watermarking of video images.

The function of the basic watermarking algorithm 1 is to perform a modulation of DCT coefficients of the transformed blocks of the image. Before performing this transformation the image is decomposed into adjacent blocks of size N×N, then each of the blocks is transformed into a block of N×N coefficients F(u,v) obtained through the known relation:

$$F(u, v) = 4/N^2 \cdot c(u) \cdot c(v) \cdot \sum_{x=0}^{N-1}\sum_{y=0}^{N-1} f(x, y) \cdot \frac{\cos(2x+1) \cdot u \cdot pi}{2N} \cdot \frac{\cos(2y+1) \cdot v \cdot pi}{2N}$$

with
u=0 to N−1
v=0 to N−1
c(i)=½√2 for i=0
c(i)=1 for i=1 to N−1

As shown by the example of FIG. 2 each block 4 of the image of N×N pixels gives rise to a block 5 of N×N DCT coefficients. In a block of the image, each pixel is referenced by its co-ordinates (x,y) with respect to the origin of the block. Likewise, each coefficient of the DCT block is referenced by its co-ordinates (u,v) with respect to the origin of the block. The embedding of a watermarking message is achieved by modifying in the manner represented in FIGS. 2 and 3 certain component coefficients of the DCT blocks. The blocks and their coefficients are chosen randomly in the manner represented in FIG. 4 by means of a block address generator 6 which determines the coefficients to be modified in each of the blocks. Each bit $b_i$ of the message to be embedded is associated with a block of the image. This bit is embedded by modifying two DCT coefficients $c_0$ and $c_1$ of this block.

The choice of these coefficients depends on the key; they are in general chosen within the low frequencies of the image, that is to say those which are to be found in the bottom left corner of the DCT coefficient blocks. For security reasons only two coefficient values $c_0$ and $c_1$ are selected as shown in FIG. 3 by random drawing. This selection is performed in a manner represented in FIG. 4 from a random generator of block addresses 6 which for each bit $b_i$ selects two addresses with coefficient ($u_0$ $v_0$) and ($u_1$ $v_1$). A map of the pairs $c_0$ and $c_1$ of selected DCT coefficients is stored in a memory space 7. The watermarking proper is subsequently carried out by modifying the values of the coefficients $c_0$ and $c_1$ according to the process described by the processing steps 9 to 19 represented on the flowchart of FIG. 5. According to this process the absolute values of the DCT coefficients of each pair of coefficients $c_0$, $c_1$ calculated in step 9 are compared in step 10 with a specified threshold value S. If the result of the comparison performed in step 10 is not less than the threshold S the coefficient block is rejected in step 11 and the process goes to step 14 to the analysis of the pair of coefficients of the next block. Conversely if in step 10 the result of the comparison is less than the threshold S the phase of embedding the bit $b_1$ is executed by modifying the value of the pairs of the selected DCT coefficients. This modification is carried out by executing steps 12 to 17$_b$, transforming each pair of coefficients ($c_0$,$c_1$) into a new pair ($c'_0$,$c'_1$) in a one-to-one manner via a function f, such that the function f complies with the relation |$c'_1$|−|$c'_0$|≧d. If in step 12 the value of the bit $b_i$ to be embedded is 0 then the absolute value of the coefficient $c_1$ takes in step 13$_a$ the absolute value |$c'_1$| obtained by adding a specified growth value d to the absolute value of the coefficient $c'_0$. In the converse case if in step 12 the value of the bit $b_i$ to be written is 1, it is the value of the other coefficient $c_0$ which is modified in step 13$_b$, taking as absolute value |$c'_0$|that obtained by adding the growth value d to the absolute value of the coefficient $c'_1$.

Tests are executed in steps 15$_a$ and 15$_b$ to determine the signs of the coefficients $c'_0$ and $c'_1$. If the result of a test 15$_a$, 15$_b$, is positive the sign given to the coefficient $c'_0$ respectively $c'_1$ is positive, on the other hand the sign becomes negative in the converse case as is depicted in steps 16$_a$, 16$_b$ and 17$_a$, 17$_b$.

To offset the fact that certain bits $b_i$ may be unusable because they lead to values of coefficients $c_0$, $c_1$ for which the test of step 10 is positive, the algorithm is repeated on all the blocks of the image, this leading for example, for a television picture standard comprising 576 lines and 720 columns per frame, to the use of a message word enabling 6480 blocks to be watermarked.

On reception the reading of the watermarking message which is performed in step 5 of the flowchart of FIG. 1 takes place in the manner represented in steps 18 to 22 of the flowchart of FIG. 6 by decoding the pairs of coefficients $c_0$, $c_1$ corresponding to each of the bits bi of the watermarking message. In step 18 the absolute value of the difference of the absolute values of the pairs of coefficients $c_0$, $c_1$ is compared with the threshold value S which was used on transmission when embedding the bit $b_i$. If the result of the comparison is positive the value of the corresponding bit $b_i$ is regarded as undetermined in step 19 and the process goes to the decoding of the pair of coefficients $c_0$ $c_1$ of the block of coefficients corresponding to the next embedded bit $b_{i+1}$. On the other hand if in step 18 the result of the test is negative, the value of the bit $b_i$ can be determined and the process goes to the execution of step 20 which consists in comparing with the value zero the difference of the absolute values of the coefficients $c_0$, $c_1$ so as to determine in step 21 that the value of the bit $b_1$ is "null" if the result of the comparison of step 20 is positive, or to determine in step 22 that the bit value $b_i$ equals "one" if the result of the comparison of step 20 is negative.

The co-watermarking process depicted in step 2 of the flowchart of FIG. 1 makes it possible to retrieve, by executing step 4, the co-ordinates of the origin of the initial image when it is received by a receiver and when it has been chopped or moved in translation, with a view to synchronization for the reading of another watermark for example.

In this case, to retrieve the origin co-ordinates of the image a first solution can consist in using the known "patchwork" algorithm of Messrs William Bender, Daniel Gruhl, and Norishige Morimoto already mentioned. In this case it is sufficient to try all the possible translations, to calculate the sum S of the luminance differences of the pairs of points of the image, retaining as origin co-ordinates only those for which the sum S is a maximum. However, this reading procedure is complicated and takes time.

The co-watermarking method according to the invention makes it possible to simplify this procedure appreciably by effectively remedying the problem encountered in the transmission of stationary images or moving images which may undergo a shift as a result of the processings introduced by the MPEG, JPEG coders or the recording hardware for example. Without an origin label, the reading of a watermark bearing a message is in fact difficult to see [sic] impossible.

According to the invention the co-watermarking process uses a binary pseudo-random matrix P of size m×m in the image, of zero average and whose autocorrelation function is the smallest possible away from the origin. As shown by FIG. 7 this matrix is obtained by symmetrizing an m-sequence of bits. In the example, the equation of the generating polynomial is $x^4+x^3+1$, but other forms of primitive polynomials may also be used. The matrix P is used to build an image $I_p$ of the size of the image to be watermarked I by periodic repetition of the latter in the manner represented in FIG. 8. The luminance values I(i,j) of the pixels with co-ordinates (i,j) in the image I are modified by applying to the latter a plus or minus marking amplitude d depending on the binary state "+1" or "−1" of the corresponding pixels of the binary image $I_p$ according to the relations:

$$I'(i, j) = I(i, j) + d \quad \text{if } I_p(i, j) = 1 \quad (2)$$

$$I'(i, j) = I(i, j) - d \quad \text{if } I_p(i, j) = -1 \quad (3)$$

In relations (2) and (3) the marking amplitude can be made to depend on the image so as to reduce the visibility of the marking.

On reception the reading of the watermarked image takes place in the manner represented in FIG. 9, building from the watermarked image I' received an image matrix M of size m×m according to the relation:

$$M(i, j) = \sum_{k=0}^{k=p} \sum_{l=0}^{l=q} I'(km + i, lm + j) \quad (4)$$

with $p < \frac{N-i}{m}$ and $q < \frac{N-j}{m}$ this corresponding to summing the blocks of size N×N of the image.

A cross-correlation calculation between the matrix M and the original binary matrix P is subsequently performed on all the possible shifts of the matrix M. This calculation is performed according to the relation:

$$S(x, y) = \sum_{i=0}^{i} \sum_{j=0}^{j} M(i, j) P((i+x) \bmod m, (j+y) \bmod m) \quad (5)$$

with i<m and j<m as a result of the calculation the co-ordinates xo and yo adopted for the origin are those for which the number S(xo,yo) is a maximum.

The co-watermarking algorithm makes it possible to retrieve the co-ordinates of the origin modulo the number m. Naturally when m=N the size of the original image, then the conditions of the "patchwork" algorithm of the prior art hold.

The purpose of executing the postprocessing step 3 of the flowchart of FIG. 1 is to examine the reliability of the data emanating from the basic watermarking in particular in automatic checking applications when the conditions of transmission are poor, in the case for example of MPEG transmissions at very low bit rate. The algorithm used uses the redundancy introduced when writing the watermark and with the aid of statistical criteria gives an estimate of the quality and of the reliability of the message read out. This redundancy takes the form of an intra-image redundancy or of a temporal redundancy. Intra-image redundancy may be utilized in the case of the watermarking of stationary images and video images. It is due to the use of error correcting codes or repetitions when writing the message. The temporal redundancy is achieved by repeating the same message on each video image, it makes it possible to estimate the quality of the message read out by giving a priori an idea of the distribution of the bits of the message read out. By assuming for example that a single bit is embedded while being repeated 10 times in the image, in this case, the message read out if it is error-free, is of the form: 1111111111 or 0000000000. If after transmission the message read is of the form 0001000000, it means that there has been at least one error and it can then be assumed with sufficiently great confidence that the 0 bit has been sent. If on the other hand the message read out is of the form 0111010011 then it is possible to decide that the 1 bit has been sent since 6 bits are in the 1 state and 4 bits are in the 0 state. However, as in the latter case the confidence in this result appears to be lower and it is more judicious not to decide.

An implementation of this algorithm is illustrated in the flowchart of FIG. 10. In this flowchart $S_{0i}$ denotes the number of times or [sic] a bit $b_i$ of rank i of the message has been read has [sic] the value 0 and $S_{1i}$ denotes the number of times or [sic] this same bit has been read with the value 1. In step 23 a first test is performed to compare the numbers $S_{0i}$ and $S_{1i}$. If the number $S_{0i}$ is less than the number $S_{1i}$ then it is decided in step 24 that there have been $S_{0i}$ transmission errors and that the bit sent probably had the value 1, on the other hand if in the converse case the number $S_{0i}$ is greater than the number $S_{1i}$ it is decided in step 25 that there have been $S_{1i}$ transmission errors and that the bit $b_i$ sent probably had the value 0. The degree of confidence to be accorded to these results is subsequently determined in the next step 27 by a binomial test of them, modelled by the Bernouilli binomial probability law. If the quality of the test appears to be sufficient the bit $b_i$ is allowed in step 27 in the converse case it is disallowed in step 28. On completion of steps 27 and 28 the system goes to the test of the next bit $b_{i+1}$ of the message received.

The invention claimed is:

1. A process for watermarking stationary or video images including embedding a message in the images before their transmission by modifying data characteristic of the images, comprising performing a co-watermarking by periodically embedding a binary matrix P into the initial image so as to determine, on reception, co-ordinates of an origin of the initial image allowing the images received to be correlated to the origin of the initial image.

2. Process according to claim 1, wherein the co-watermarking binary matrix is a pseudo-random matrix P of size m×m obtained by symmetry of a binary m-sequence.

3. Process according to claim 1, further comprising building an image $I_p$ of the same size as the initial image by periodic repetition of the pseudo-random matrix P, and modifying the initial image pixel luminance values, each pixel of the initial image having co-ordinates which correspond to the co-ordinates of the pixels of the image obtained by periodic repetition of the co-watermarking matrix, whereby the luminance values are modified using a marking amplitude, which for each pixel, depends on the binary state of the corresponding pixel in the image.

4. Process according to claim 2, wherein, to determine at reception the co-ordinates of the origin of the initial image, further comprising chopping the image received into blocks, summing the blocks to form a matrix M of size m×m, cross-correlating the matrix M with the co-watermarking binary matrix P by successive shifts of the matrix M relative to the matrix P, and taking as co-ordinates of the origin the co-ordinates for which the cross-correlation product is a maximum.

5. Process according to claim 1, wherein, to perform a watermarking on video images, further comprising transforming the image into blocks of DCT coefficients, embedding a message into the image by modulating the DCT coefficients so as to perform an adaptive marking in order to achieve invisibility of the embedded message upon the restoration of the image, and rendering the message robust to degradations by the use of a redundancy.

6. Process according to claim 5, further comprising associating with each bit $b_i$ of the message to be embedded two coefficients of a block of DCT coefficients and modifying the values of the two coefficients selected as a function of the binary value of the bit of the message to be embedded.

7. Process according to claim 6, wherein, to perform the watermarking, further comprising comparing a difference of absolute values of the pairs of coefficients chosen from each block with a specified threshold value S so as to modify the absolute value of one of them as a function of the binary state of the bit of the message to be embedded when the result of the comparison is less than the specified threshold value S.

8. Process according to claim 5, wherein, to read the watermark of a video image, further comprising decoding the pairs of DCT coefficients corresponding to the bits of the embedded message by comparing an absolute value of the difference of the absolute values of the pairs of coefficients with the specified threshold value S, comparing with a zero value the difference of the absolute values of the pairs of coefficients so as to determine a binary state of the corresponding embedded bits when the result of the comparison is less than the value of the threshold S or declaring the binary state of the embedded bits as being undetermined if the result of the comparison is greater than the value of the threshold S.

9. Process according to claim 1, further comprising performing a watermarking on all pixels in the image.

10. Process according to claim 1, further comprising performing a postprocessing on the images received so as to estimate quality and reliability of the embedded message by using redundancy of the embedded message.

11. Process according to claim 10, further comprising repeating the watermarking message on each video image during a specified number of times by comparing for each bit of the watermarking message a number of times it is received according to a first state and the number of times it is received according to a second state, and comparing totalized values thus obtained with a specified threshold value determined by the Bernouilli binomial probability law.

* * * * *